Sept. 20, 1932.　　　A. R. PURSLEY　　　1,877,965
APPARATUS FOR COOLING MILK
Filed May 23, 1931
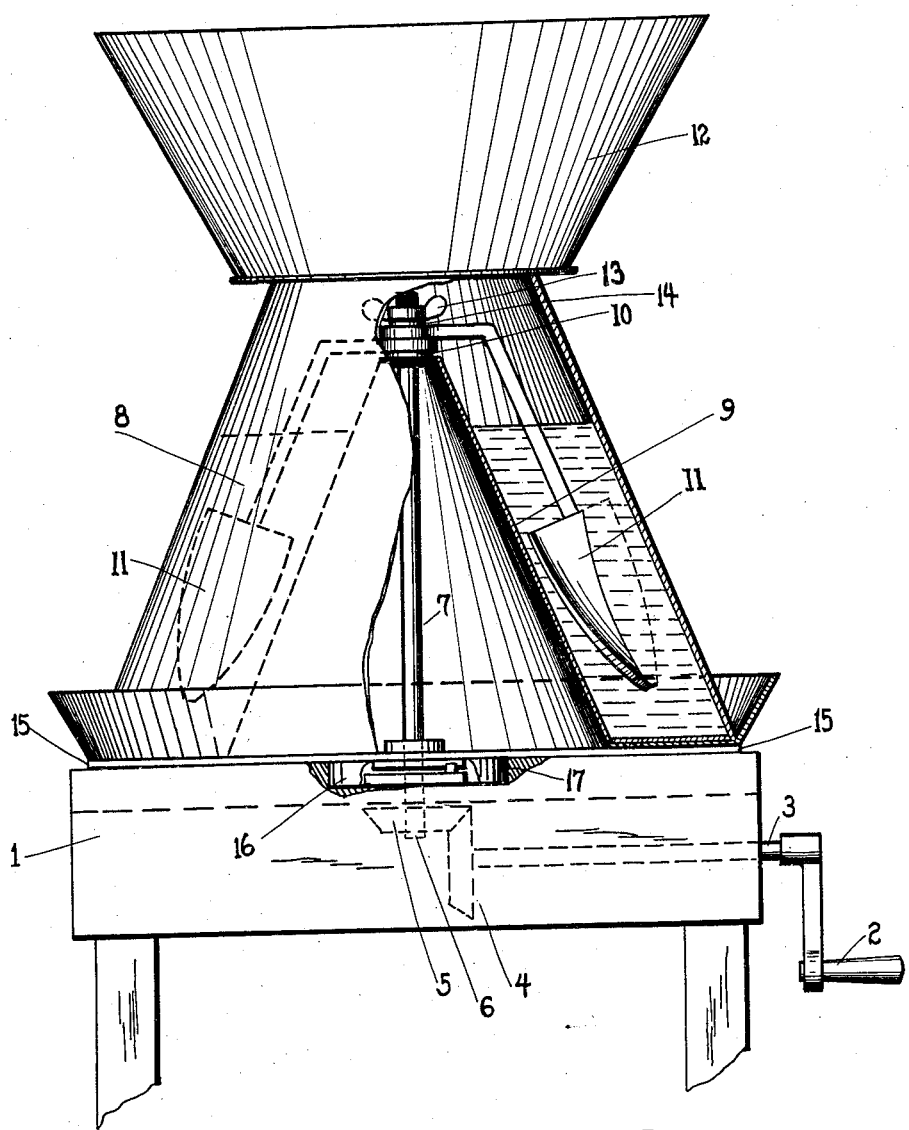
ALVA R. PURSLEY,
INVENTOR.
By [signature]
ATTORNEY.

Patented Sept. 20, 1932

1,877,965

UNITED STATES PATENT OFFICE

ALVA R. PURSLEY, OF EUFAULA, ALABAMA

APPARATUS FOR COOLING MILK

Application filed May 23, 1931. Serial No. 539,457.

The invention relates to apparatus to be employed in bringing fresh milk down to suitable temperatures, and the object of the invention is to provide novel, simple, inexpensive and efficient apparatus for this purpose, easily kept in clean and sanitary condition with minimum of labor, capable of operation with less ice than usual with existing cooling apparatus, and in which the milk, while being cooled, is protected from contamination by grease, dirt, or the like, from the mechanism.

The drawing shows the features of the invention in a partly sectional view or side elevation.

In the drawing 1 is a suitable bench or table, serving to support the truncated cooling cone or ice receptacle. By means of a crank 2, a horizontal shaft 3 can be operated, this driving through bevel gears as 4, 5, a vertical shaft 6, adapted to engage through a simple and effective clutch the vertical shaft 7 within the central space or tunnel of the ice chamber. It is to be understood that I may employ any means of driving by hand or power the vertical shaft 7 but prefer some means of driving shaft 7, as by a simple clutch operating on a fixed vertical shaft 6, so that the whole mechanism above the top of the table or bench can be readily removed for cleaning.

The ice chamber 8, having the usual external appearance of a truncated cone, is made differently in that within the outer cone is an inner cone or shaft tunnel, see the sectional portion at 9, the effective ice chamber thus being the space between the inner and outer cones as clearly indicated in the sectional view at the right of the figure. This inner cone, or shaft tunnel, is preferably made as shown, also a truncated cone, for obviously it is unnecessary to have ice, or ice water in the central part of the container, only that ice near the inner surface of the outer cone being effective as a cooling agent. The shaft tunnel, or cone, 9, might be simply a cylinder, as it functions, aside from reducing the capacity of the ice chamber to support the upper end of the driven shaft 7, this being through a suitable bearing or bushing as at 10.

The space between the inner and outer cones is filled with a mixture of ice and water, or salt and ice, or ice, or whatever cooling medium is employed. By means of paddles, as at 11, 11, driven around by the shaft 7, this cooling medium is progressively driven around, greatly decreasing the time required to cool the milk, and the amount of ice used. It will be understood, of course, that as usual in the cone type milk coolers the milk flows down gently on the outer surface of the cooling cone from the usual container 12, such as is common in the art, through suitably small openings.

The paddles 11, 11, are so shaped as to produce a radial motion to the ice or ice and water as the case may be, thus producing a circulation not only around the cone but insuring a supply of cooling medium against the external sides of the cone 8. These paddles may have a common arm carrying both or separate arms as shown. They are preferably secured to the drive shaft, not by square holes or other hard and fast attachment but simply held in frictional engagement, as by the wing nut 13, and washer 14, so that in event they jam from any cause there will be no breakage but simply a slipping at the point of attachment to shaft 7.

It is desirable to be able to lift the cooling chamber or double cone arrangement off the table for the purpose of cleaning it. Hence I employ the broken shaft arrangement, or clutch to drive shaft 7 by shaft 6. The lower end of shaft 7 is journaled in a bushing supported by two or more straps or members two of which are shown at 15, 15. I provide, also carried by these members 15, 15, a collar, 16, arranged to fit more or less loosely in a circular recess 17, in the top of the table or bench 1, this recess being shown in section, so that it is simply necessary to place the cooling cone on the bench and move it until the collar 17 fits into the recess 17 when the shafts 6 and 7 are approximately in line. I provide a dog at upper end of shaft 6 and this engages another dog or equivalent at lower end of shaft 7, so that regardless of exact alignment of the two shafts the operation of shaft 6 drives shaft 7.

By the arrangement shown all the driving mechanism is confined to the bench or table, and any one of several coolers can be mounted at will on the table and driven by the one driving means. This permits of cleaning one cooler while another is being operated. Also, by having the drive mechanism wholly separated from the cooler I avoid all danger of grease from the drive mechanism entering the milk; the actual operating shaft 7 of any cooler being wholly within the inner cone or shaft tunnel, which is an important part of my invention, and thus wholly separated from any surfaces wetted by milk.

I am aware, of course, that it is not new in the art to flow milk over the outer surface of a cone shaped cooler and also that it is old to agitate or stir the cooling agent within the cone. My invention, however, goes considerably further in that it permits one driving mechanism to be used with a plurality of coolers, effectually prevents grease and the like from entering the milk, and permits thorough cleaning of the cooler, inside and out, for it is simply necessary to take out the paddles and then the space between the two cones can be cleaned with the utmost ease.

I can also, if desired, extend the drive shaft 6 up to the limit of shaft 7, dispensing with shaft 7 entirely, and do not prefer this simply because on account of the weight of the container or cone when filled with ice or ice water it is more convenient to have the vertical shaft system in two parts, 6 and 7, rather than have to lift the loaded cone high enough to clear a single sufficiently high vertical shaft.

Having described my invention what I claim is—

1. In a milk cooler a substantially conical shaped container for the cooling medium provided with a shaft tunnel extending upward within it from its bottom, an agitator arranged to move the contents of said chamber, and a shaft within said tunnel arranged to drive said agitator, substantially as set forth.

2. In a milk cooler a container for the cooling agent having an external surface increasing in diameter downwards, a shaft tunnel centrally disposed within such container from its bottom, means arranged to circulate the cooling agent, and means arranged to drive said circulating means through said tunnel.

In witness whereof I have hereto set my hand, at Montgomery, Alabama, this May 20th, 1931.

ALVA R. PURSLEY.